Figure 1A:
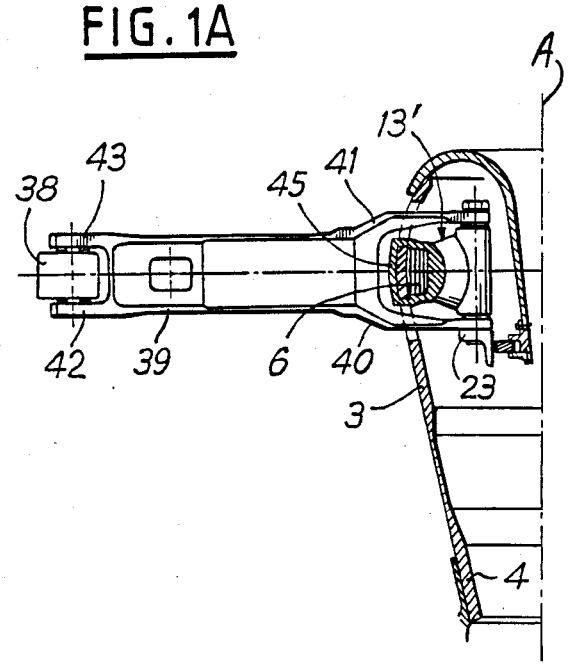

United States Patent [19]

Mouille et al.

[11] Patent Number: 4,749,339
[45] Date of Patent: Jun. 7, 1988

[54] INTEGRATER HUB-MAST AND GYROPLANE ROTOR HEAD COMPRISING IT

[75] Inventors: René L. Mouille; Jean-Luc Leman, both of Aix-en-Provence, France

[73] Assignee: Aerospatiale Societe Nationale Industrielle, Paris, France

[21] Appl. No.: 885,997

[22] Filed: Jul. 16, 1986

[30] Foreign Application Priority Data

Jul. 22, 1985 [FR] France .................. 85 11158

[51] Int. Cl.[4] .............................................. B64C 27/38
[52] U.S. Cl. .................... 416/140; 416/134 A; 416/141
[58] Field of Search .......... 416/134 A, 138 A, 140 A, 416/141, 244 D

[56] References Cited

U.S. PATENT DOCUMENTS

| 3,322,200 | 5/1967 | Tresch | 170/160.25 |
|---|---|---|---|
| 3,545,880 | 12/1970 | Mouille | 416/244 D X |
| 3,761,199 | 9/1973 | Ferris et al. | 416/244 D X |
| 4,249,862 | 2/1981 | Waddington et al. | 416/141 X |
| 4,297,078 | 10/1981 | Martin | 416/134 A |
| 4,304,525 | 12/1981 | Mouille | 416/134 A |
| 4,375,940 | 3/1983 | Lovera et al. | 416/114 |
| 4,407,633 | 10/1983 | Mouille | 416/141 X |
| 4,504,193 | 3/1985 | Mouille | 416/134 A X |
| 4,512,717 | 4/1985 | Pancotti et al. | 416/138 A X |
| 4,516,909 | 5/1985 | Caramaschi et al. | 416/140 A X |

FOREIGN PATENT DOCUMENTS

| 0085127 | 8/1983 | European Pat. Off. . | |
| 2192942 | 2/1974 | France . | |
| 2427251 | 12/1979 | France . | |
| 2457804 | 12/1980 | France . | |
| 2456034 | 7/1983 | France . | |
| 2516891 | 2/1984 | France . | |
| 2028749 | 3/1980 | United Kingdom | 416/134 A |
| 2136377 | 9/1984 | United Kingdom . | |

Primary Examiner—Everette A. Powell, Jr.
Attorney, Agent, or Firm—Armstrong, Nikaido, Marmelstein & Kubovcik

[57] ABSTRACT

The invention provides an integrated hub-mast with a single piece tubular body which supports, by its hub body part (3), a reinforcing girdle (6) on each side of which openings (10, 11) are formed. For each blade of the rotor a retaining and pivoting member (13), formed preferably by a spherical stratified stop, is fixed to the girdle (6) and is retained in the hub body (3), and this member (13) is also fixed between the ends inside the hub body (3), of the lower (20) and upper (21) branches of a forked fastening part (19) connecting the blade to this member (13), these branches passing through the openings (10, 11) of a corresponding pair of openings. A heel (23) fixed under the lower branch (20) bears against a reciprocal ring (24) mounted on a support (29) in the hub-mast (1), which has external fastenings for coupling to resilient return and drag damping members of the blades.

19 Claims, 5 Drawing Sheets

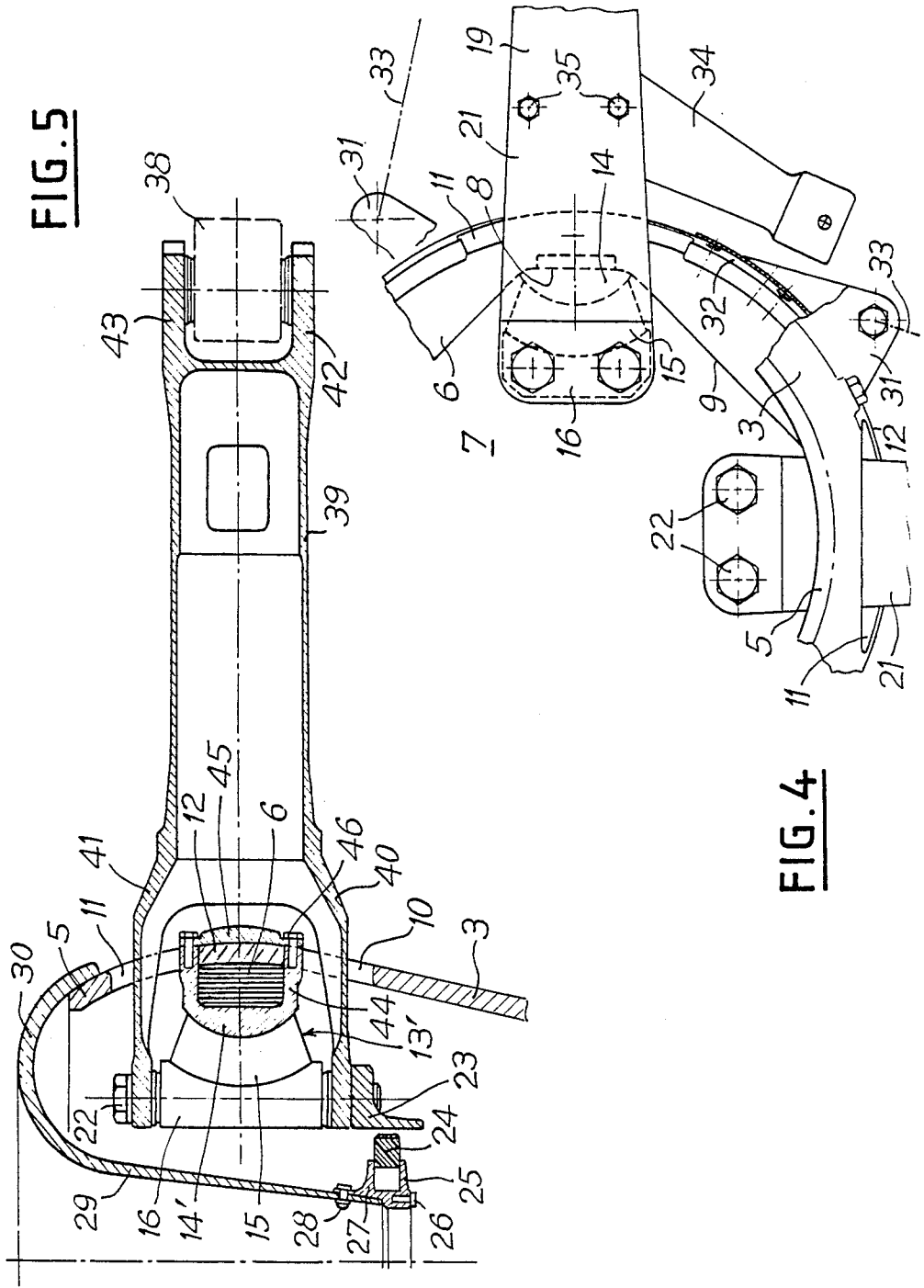

INTEGRATER HUB-MAST AND GYROPLANE ROTOR HEAD COMPRISING IT

The present invention relates to gyroplane rotors and more particularly to an integrated hub-mast as well as a rotor head equipped with such an integrated hub-mast and intended in particular for equipping helicopters.

In French patent No. 2 427 251 and its first certificate of addition no. 2 456 034 as well as in French application no. 81 22 027, main rotor or rear rotor heads for helicopters have been described which comprise a mast and a hub body which may be integrated in the form of a single block made from a metal or composite material.

The helicopter rotors described in these documents each have a central rigid hub body, to which the root of each blade of the rotor is coupled by means of a stratified spherical stop and a drag damper, or resilient drag return brace with incorporated damping.

The stratified spherical stop which forms a pivoting joint allowing the corresponding blade to move about its three flapping, drag and angle of attack or pitch control axes, has a central stratified part formed of an alternating stack of spherical skull caps of a rigid material and of a visco-elastic material and working under compression and shearing between an external frame integral with the hub and an internal frame fixed to a member for connection to the blade.

The drag damper, which may be hydraulic but which is preferably formed of an alternating stack of rigid plates and plates of a visco-elastic material, or of coaxial tubes between which is incorporated a cylindrical sleeve made from a resilient material, has its ends coupled by ball and socket joints to the root of the corresponding blade and to a point of the hub, so that for the angular drag movements of the blade it provides an energetic resilient return to the neutral axis while simultaneously introducing a certain damping of these movements.

In French patent no. 2 427 251, the central body of the hub has the form of a plate or flat ring, with convex polygonal or substantially circular periphery, extending substantially radially with respect to the axis of rotation of the rotor, which merges with the axis of the rotor mast supporting the hub, and this plate is pierced in the direction of the axis of the rotor, with as many openings or recesses as the rotor has blades. A stratified spherical stop is mounted bearing by its external frame against the external edge of each opening, whereas the internal frame is fixed to the internal ends of the branches of a forked piece integral with the root of the corresponding blade, and the point of the periphery of the hub, to which the corresponding drag damper is coupled by means of a ball and socket joint, is situated between the corresponding stratified spherical stop and that of the blade immediately preceeding or following the corresponding blade, in the direction of rotation of the rotor. Moreover, a lever for controlling the angle of attack of the corresponding blade is fixed to the forked piece, on the side opposite the corresponding drag damper and, finally, in the case of a main rotor, the lower branch of the forked piece has, under its internal end, a stop limiting the downward flapping movement of the corresponding blade, by cooperation with a reciprocal ring mounted for sliding radially about the rotor mast, below the hub, so that the stop comes into abutment against the reciprocal ring at low rotational speeds of the rotor and when the rotor is stopped.

The forked piece may be formed by an extension of the root of the corresponding blade, or else by a radial clevis at the internal end of an added member for connection to the root of the corresponding blade, the two branches of this internal end clevis or of this extension being fixed to the internal frame of the corresponding stratified spherical stop by two bolts. In the case of using an added member for connection to the root of the blade, this member also has, at its external end, another clevis by which it is fixed to the root of the corresponding blade by two shafts substantially perpendicular to the plane of the rotor, and one of which is removable so that the blade may be folded back into the plane of the rotor by pivoting about the other shaft.

In order to integrate, if required, in the rotor a device for automatically folding the blades, it has been proposed that this added connection member be in the form of a sleeve, of which a cylindrical part allows this device to be housed and which also serves for fixing the lever controlling the angle of attack of the corresponding blade, the corresponding damper and the low stop cooperating with the reciprocal ring.

In order to eliminate all the potential problems which result from bolted connection of the hub to the rotor mast, such as corrosion under tension or slackening of the bolts, the central body of the hub and the mast may be integrated, and it has been proposed that the central rigid body of the hub form, with the mast of the rotor, a single block metal piece, made for example from steel or titanium and integrally forged or die stamped. However, so as to reduce the vulnerability, the mass and the cost of such an integrated hub-mast, this latter may be made from composite materials, by stacking or draping folds of high mechanical strength mineral or synthetic fiber fabrics which are impregnated and agglomerated by means of a synthetic resin which is subsequently cured and hardened. In this latter case, so as to give a good "fail-safe" character to the integrated hub-mast, a composite structure girdle is advantageously wound about the hub plate.

The rotors described in the first certificate of addition no. 2 456 034 to the above mentioned French patent are essentially distinguished from those which form the subject of this parent patent by the fact that their hub body has a central stock, extending the mast of the rotor and carrying an upper plate and a lower plate, the external frame of each stratified spherical stop being embedded between and fixed directly to the edges of the two plates, in the manner of a rigid spacer, and the root of the corresponding blade being joined to the internal frame of the stratified spherical stop by a radial clevis recessed for the free passage of the spherical stop. Moreover, it was proposed in this certificate of addition that the assembly of the hub, particularly its stock and its two plates, form with the upper part of the rotor mast a single block piece made for example from metal and integrally forged or die stamped therewith. By analogy with the proposed developments of the rotors described in the parent patent, for equipping rotors according to the above mentioned certificate of addition an integrated hub-mast may be contemplated having two substantially radial plates in a composite structure. It should be noted that such a construction would go, in the reduction of the number of parts and the suppression of connections, far beyond the rotor constructions described in the French patent application no. 2 429 860 and which comprise two plates made from composite materials fixed to a metal spacer which separates them and to the upper part of the metal rotor mast by bolts, in a basic architecture identical to that of the rotors described in the French patent application no. 81 22027 and being essentially distinguished from the rotors of the above mentioned certificate of addition by the fact that the root of each blade has a loop which directly surrounds the corresponding stratified spherical stop and is fixed to the internal frame thereof.

However, the fabrication of the hub and of the mast of the rotors described in all the above mentioned documents in the form of an integrated hub-mast, still proves delicate, difficult and costly, whether this single block piece is made from metal or from composite materials and whether it has a single radial plate with recesses or two radial plates without recesses. In fact, the integrated hub must have, on the side opposite its root by which it is driven in rotation, one or two parts opened out in the form of a corolla, forming the hub plate or plates. In one metal construction, the die stamping of these corolla parts is a relatively simple operation. On the other hand, the construction of such a part from composite materials is very difficult for it is, during use, heavily loaded under flexion and shearing forces and, in addition, its concave or doubly concave shape also makes fabrication thereof very complex, whatever the method used. In particular, the construction of a part opened out in the form of a corolla so as to form a hub plate raises numerous problems, particularly in so far as the thickness variations are concerned between the mast forming part and the hub plate forming part, which must be obtained while ensuring simultaneously changes of about 90° of the orientation of the high mechanical strength fibers, and the stacking or draping without forming folds of the fiber fabric layers in this doubly evolutive zone (having curvatures in two substantially perpendicular directions), which raise a problem related to the extension of the fabrics.

By the present invention, it is proposed to overcome these major drawbacks and the invention has as object an integrated hub-mast having both a simplified and very light structure, with improved safety and reliability, and which may be made from metal or a composite material in a simpler, more economical and more reliable way.

The invention provides then an integrated hubmast whose mass is smaller and whose lifespan is increased and maintenance simplified, which lowers the direct operating costs.

The invention also provides an integrated hubmast whose structure is advantageously adapted to a composite material construction, so as to have a good "fail-safe" character.

The integrated hub-mast of the invention, of the type having a tubular part forming a mast, one end of which is shaped as a foot by which the hub-mast is intended on the one hand, to be connected to an end part of a gear box of the helicopter for transferring to the fuselage the forces and moments originating from the rotor and, on the other hand, to be rotated about the axis of the mast forming part, which is fixed, on the side opposite the foot, to a part forming a hub body coaxial with the mast forming part and intended to be connected to rotor blades, is characterized in that the hub body forming part is also a tubular part which extends the mast forming part, and in that pairs of openings, in number equal to the number of blades of the rotor, are formed in the hub body forming part and are evenly spaced apart in the circumferential direction about the periphery of this hub body forming part, the two openings of each pair being axially spaced from each other, and a reinforcing girdle, preferably made from composite materials and formed of unidirectional high mechanical strength mineral or synthetic fibers coiled and agglomerated by means of a hardened synthetic resin is fixed to the hub body forming part, against the internal or external face of this part, and between the two openings of each pair. The general form of such an integrated hub-mast is much better adapted to a construction using composite materials than the known forms of the state of the art, for it allows these composite materials to withstand forces and work in the direction of the fibers, while reducing the induced shearing, because of the nature of the forces received at the level of the hub body forming part and transmitted by the hub-mast to the foot of the mast forming part. These forces are the centrifugal forces which are exerted on the blades of the rotor as well as the vertical flapping forces and the drag forces of the blades, which induce respectively a moment and a torque which the hub-mast transmits to its foot over a much more direct path than in the integrated hub-mast constructions of the prior art.

Preferably, the ends in the circumferential direction of the openings, on the one hand the closest to and on the other the furthest away from the mast forming part are substantially and respectively in a first and in a second transverse plane perpendicular to the axis of the hub-mast, and the reinforcing girdle is fixed against the annular band defined on the internal or external face of the hub body forming part between the first and second transverse planes.

Advantageously, the two openings of each pair have substantially the shape of a haricot bean and have their concavity turned towards each other.

In an advantageous embodiment which facilitates fabrication of the hub-mast, the mast part and the hub body part are formed by a single tubular piece with symmetry of revolution and the two openings of each pair of openings are symmetrical one with the other with respect to a median plane of the reinforcing girdle which is perpendicular to the axis of the hub-mast.

So that the girdle has excellent rigidity, allowing it to take up the centrifugal forces originating in the blades of a rotor equipped in the above described way with such a hub-mast, the reinforcing girdle has an external lateral surface substantially in the form of a circular ring and an internal lateral surface substantially in the form of a ring with polygonal section.

Advantageously, at least the mast part has a general substantially frustro-conical external shape diverging from the foot of this part towards the hub body part, so that the diameter of the foot of the hub-mast may be adapted to a rotational drive and mounting device having at least one bearing whose size is relatively large without being prohibitive.

The general arrangement of such an integrated hub-mast is particularly interesting for a composite material construction using high mechanical strength fibers agglomerated by means of a hardened synthetic resin and, in this case, the girdle is made from composite materials and is advantageously formed as a single piece with the hub part which has a general substantially convex external shape.

However, it is possible for the mast and hub body parts to be made from metal, the hub body part having a general substantially cylindrical or frustro-conical external shape diverging towards its free end opposite the mast part, so as to allow positioning of the girdle, made from composite or metal materials, inside the hubmast or thereabout.

But such a metal construction has fewer advantages, in terms of weight, cost and "fail-safe" character than a composite construction which, in a preferred embodiment, is such that the hub body part has substantially the shape of a drum with maximum diameter at the level of the girdle. Such a hub-mast, whose form is advantageous for aerodynamic drag considerations, lends itself readily to fabrication from carbon or KEFVLAR fiber composite materials, either by winding rovings of these materials preimpregnated with an epoxy resin which is then cured and hardened, or by draping fabrics made from fibers of these materials preimpregnated with an epoxy resin, then pressure molding and hot curing of the resin, the openings being subsequently machined in the hub-mast.

In order to have a lower stop for limiting the downward flapping movements of the blades of a rotor equipped with this hub-mast, a rigid reciprocal ring is mounted for lateral sliding in a circular U shaped housing opening radially outwardly and held in position by a support coaxially with respect to the hub-mast and thereinside, at an axial level situated between the mast part and the openings nearest tq this mast part.

Thus, because of its arrangement inside the hub-mast, the diameter and so the mass of the reciprocal ring are less than what they would be if this reciprocal ring were mounted about the hub-mast, as is the case in the state of the art.

In a first preferred embodiment of the support for the circular U shaped housing, this support comprises a frustro-conical portion, internal to the hub body part and which supports the circular housing at the level of its small base, whereas its large base is extended by a portion opening out and folded back, outside the hub body part, above the free edge of this part to which the support is fixed by screws. But it is also possible, in a second embodiment of the support, for this latter to have a tubular substantially frustro-conical surface bearing against the internal face of the mast part and a tubular centering shell also substantially frustro-conical which is fixed to the bearing surface and which supports the circular housing.

For facilitating coupling to the hub-mast of the internal ends of the resilient return and drag damping members associated with the blades of a rotor equipped with such an integrated hub-mast, coupling fastenings, in number equal to the number of pairs of openings, are preferably fixed each by a base against the external face of the hub body part or of the girdle, at an axial level situated subtantially between the two openings of the pairs of openings, and the base extends circumferentially about the periphery of the hub body part or of the girdle between two adjacent pairs of openings. The circumferential extension of a fastening base between two adjacent pairs of openings provides a better distribution of the stresses in the hub-mast, without localized concentration of stresses as would be obtained if the base of each fastener had a small surface bearing against the hub body part.

In addition, in order to be able to transfer the torque and moment due to the respectively drag and flapping forces exerted on the blades, to the bearing or bearings of a rotational drive device fixing the hubmast to a gear box, the foot of the mast part is preferably bolted to a fitting for connecting to this device.

The invention also relates to a rotor head, for a gyroplane rotor, of the type having an integrated hub-mast intended to be rotated about the axis of a rotor by one of its parts forming a mast and having a hub body part to which rotor blades are connected each by a forked tastening part with two branches and by means, on the one hand, of retaining and pivoting members comprising preferably at least one stratified stop, an external frame of which is fixed to the hub body part and an internal frame of which is fixed to the internal ends of the two branches, and, on the other hand, of a resilient return and drag damping member whose ends are pivoted by ball and socket joints one on the forked fastening part of the corresponding blade and the other at a point of the hub body part and this rotor head is characterized in that the integrated hub-mast is in accordance with the invention and such as described above, and in that the retaining and pivoting members are housed inside the hub body part, and each of the two branches of a forked fastening part passes through one of the openings of a pair of openings between which the corresponding retaining and pivoting members are fixed for bearing by their external frame against the reinforcing girdle or the hub body part. The opening of the free end of the hub body part must be sufficient for introduction of the retaining and pivoting members inside the hub body part, and the internal cross section of this hub body part, at the level of the reinforcing girdle, must be sufficient for arranging the retaining and pivoting members so as to bear by their external frame against the girdle or against the hub body and between the two openings of the pairs of openings, and for fixing the internal ends of the two branches of the forked fastening parts of the blades to the internal frames of the retaining and pivoting members whence the advantage of a barrel shape for the hub body part. For this reason, and even if the mast part is in the shape of a truncated cone and converges towards its foot, the diameter of the hub-mast is always relatively large and the stresses due to the torque and to the moment(induced respectively by the drag and flapping forces exerted on the blades) are small. This arrangement of the retaining and pivoting members in the hub body part reduces considerably, in the hub-mast, the flexion and shearing stresses due to the alternate bending forces at the level of the members, especially if these latter are formed for each blade by a stratified spherical stop fixed to the hub body part so that its center of rotation is practically in the thickness of the hub body part or of the girdle, between the two corresponding openings. Furthermore, the centrifugal forces originating from the blades are taken up and balanced between said blades by the reinforcing girdle, working under traction and thus these forces are practically not exerted on the hub-mast. In addition, since its diameter remains still relatively large, the hub-mast only undergoes small torsional forces due to the drive torque, which is transmitted to the foot of the mast part for rotating the hub-mast. Furthermore, it should be noted that the bending flapping forces pass directly from the retaining and pivoting members to the foot of the hub-mast while following a practically straight line path and with moderate tractive-compression forces.

Finally, the arrangement of the rotor head of the invention allows the retaining and pivoting members to be placed as close as possible to the axis of the rotor, since the central volume of the hub body part is not occupied by the material. This technical measure leads not only to a reduced space requirement of the hubmast, whence a mass and aerodynamic drag which are also reduced but also to a lower vibratory energization level, for the flapping eccentricity is smaller by comparison with the above described prior art constructions.

The external frame of the retaining and pivoting members may be fixed to the hub-mast by means of a shaft passing from the outside through the hub-mast portion situated between the two corresponding openings and the reinforcing girdle for screwing into this external frame. But, so as not to weaken the structure of the hub-mast, or that of the reinforcing girdle, by holes pierced in the working parts and so as to provide a transfer of forces and moments by direct bearing, this external frame is advantageously formed, outwardly, as a stirrup which covers the reinforcing girdle and the portion of the hub body part which is defined between the two corresponding openings, and a cover, applied against the external face of the girdle or of this portion of the hub body part, is screwed to the stirrup and holds the corresponding retaining and pivoting members in position inside the hub body part.

So as to limit the downward flapping movement of each blade by bearing against the reciprocal ring mounted inside the hub-body, a rigid heel is advantageously fixed to the lower branch of the forked fastening part of the corresponding blade by two bolts which fix the internal ends of the two branches of this forked fastening part to the internal frame of the corresponding retaining and pivoting members.

In addition, on the rotor head of the invention, the resilient return and drag damping member, provided for each blade of the rotor, is advantageously mounted outside the hub body part, between one of the coupling fastenings fixed against the external face of the girdle or outside this hub body part and a coupling fastening carried by the forked fastening part of the corresponding blade. For each blade of the rotor, the rotor head of the invention also includes a lever controlling the angle of attack of the blade, and this lever is fixed to the corresponding forked fastening part, on the side opposite the return member, and outside the hub body part.

When it is not necessary for the blades of the rotor to be able to "fold back" into the plane of the rotor, it is advantageous, in a way known per se, for the forked fastening part of each blade to be directly integrated in the foot of this blade. On the other hand, if the blades are to be foldable, and also in a way known per se, the forked fastening part of each blade is a substantially radial fastening sleeve formed, at its internal end, as a clevis whose two branches are fixed to the internal armature of the corresponding retaining and pivoting members and also formed, at its external end, as a clevis for fixing to the root of the corresponding blade by two shafts substantially parallel to the axis of rotation of the rotor and one of which is removable so as to allow the blade to be folded back by pivoting about the other shaft. Whatever the configuration adopted, it can be seen that the rotor head of the invention is formed of a small number of pieces all having relatively simple shapes adapted to the forces to be withstood, which allows the mass and the manufacturing and maintenance costs of this rotor head to be reduced while improving its stability and reducing the vibrations, which is a factor of safety and reliability. Since, in addition, the space required by such a rotor head of the invention is limited because the retaining and pivoting members and the lower stop device are housed in the integrated hub-mast the aerodynamic drag is reduced and all these advantageous results combine to increase the performances of the helicopter equipped with such a rotor head, not only for its main or sustaining rotor or rotors but also for its rear or anti torque rotor.

Figure 1B:
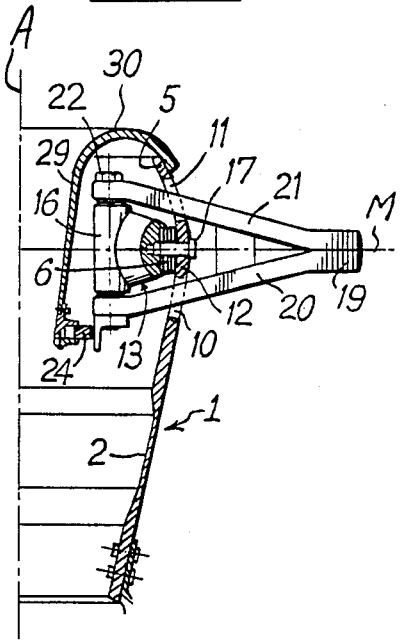
Figure 3:
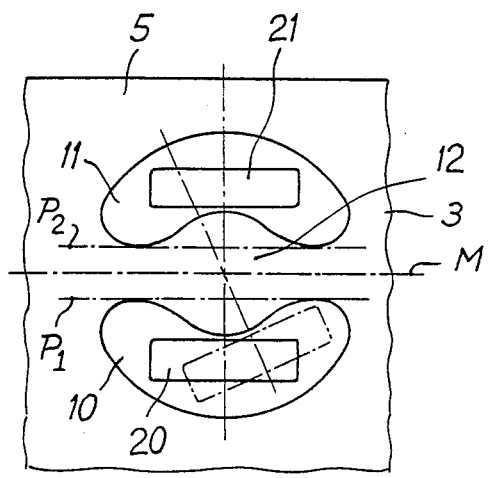
Figure 2:
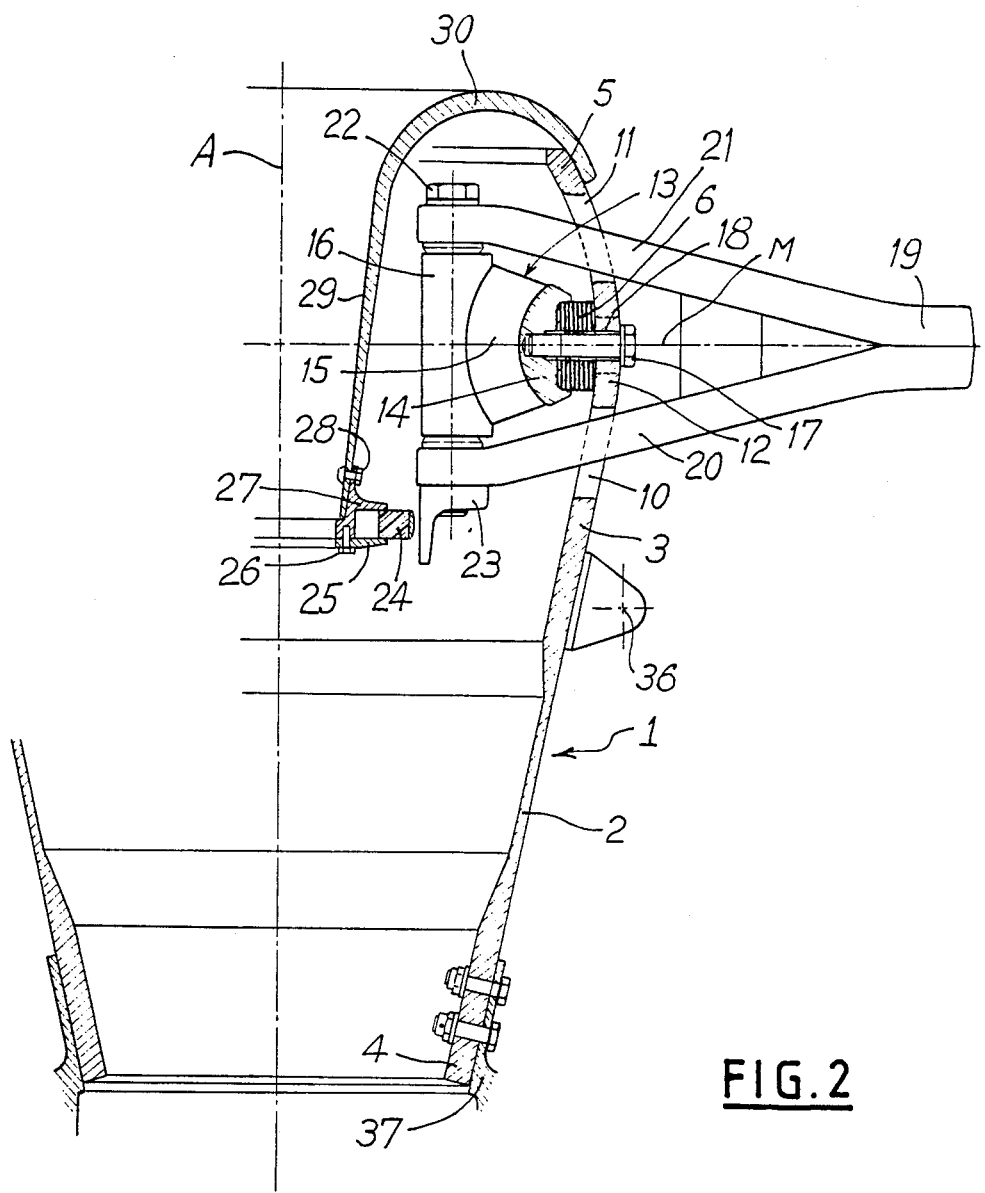
Figure 6:
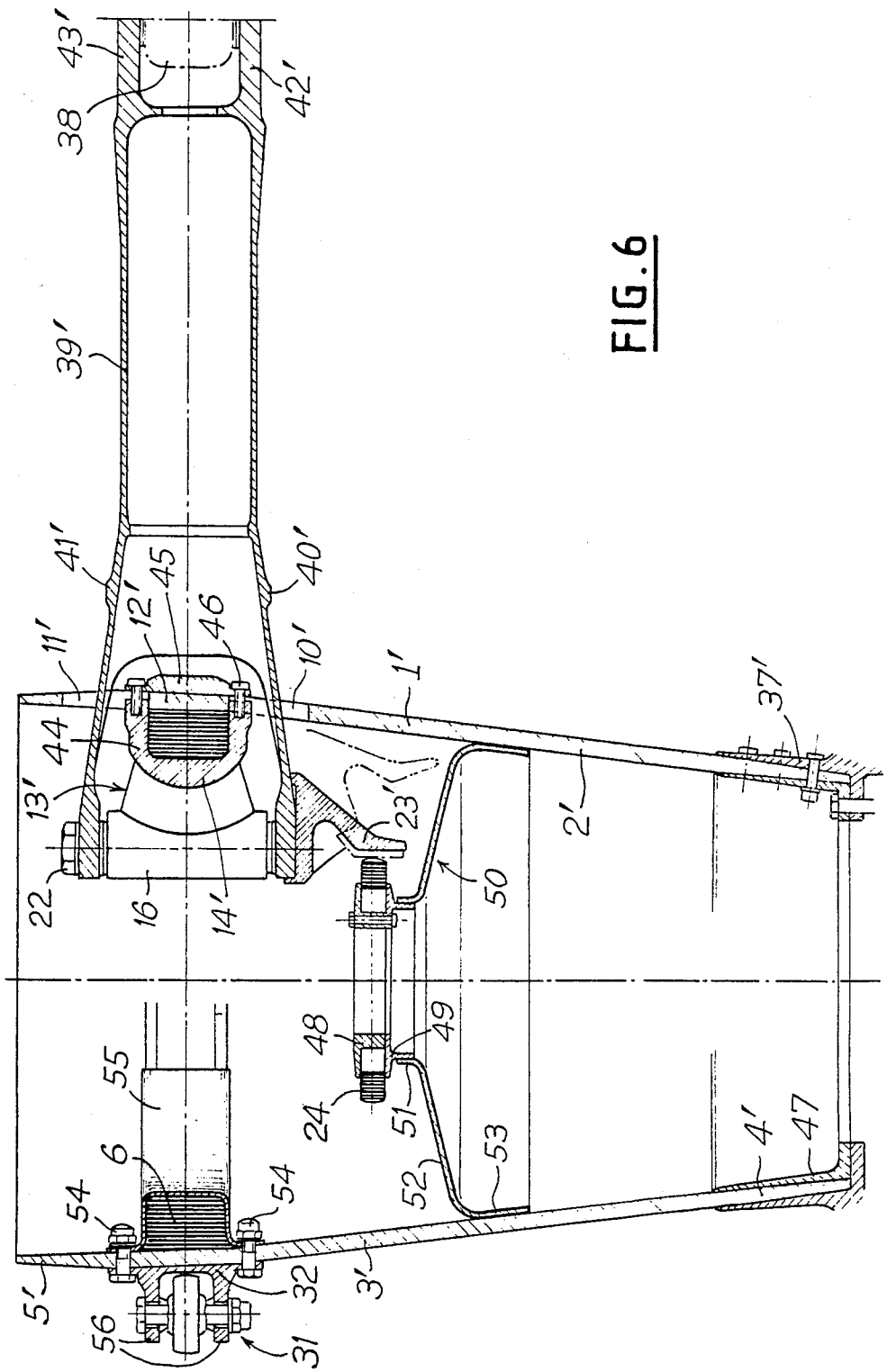
Figure 7:
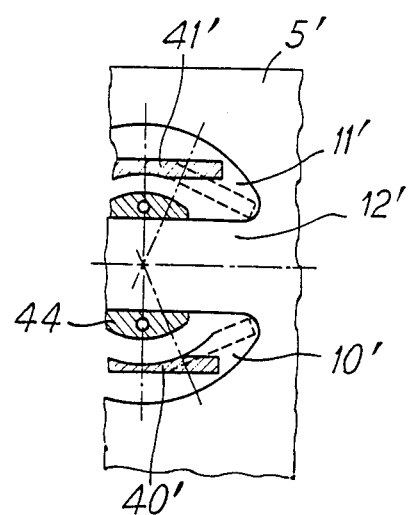
Figure 8:
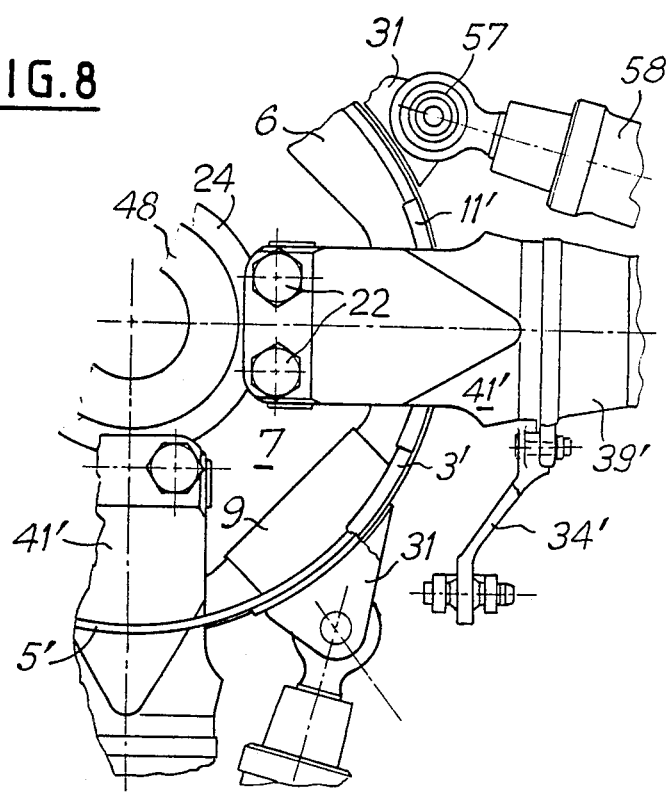

The invention will be better understood from the description given below of particular embodiments, described by way of non limitative examples with reference to the accompanying drawings in which:

FIG. 1 is a schematical view of an axial section of a first example of an integrated hub-mast with internal reinforcing girdle shown, in the right hand half section FIG. 1B, as being associated with a non foldable blade for forming the rotor head of a first main helicopter rotor example, whereas the left hand half section FIG. 1A shows the association of this integrated hub-mast with a foldable blade for forming the rotor head of a second main helicopter rotor example, FIG. 2 is an axial half section, on larger scale, corresponding to the rotor head shown in the right hand half section of FIG. 1, FIG. 3 is a partial schematical view, partly in section and partly in side elevation, of the rotor head of FIG. 2, FIG. 4 is a partial schematical view, partly in section with parts cut away and partly in a plane view, of the rotor head of FIG. 2, FIG. 5 is an axial half section of the upper part of the rotor head shown in the left hand half section of FIG. 1, FIG. 6 is an axial sectional view through two 45° half planes of a second integrated hub-mast example associated with foldable blades for forming the rotor head of a third main helicopter rotor example, FIG. 7 is a view similar to FIG. 3 for the rotor head of FIG. 6, and FIG. 8 is a view similar to FIG. 4, for the rotor head of FIG. 6.

Referring to both sides of FIG. 1, the main rotor head includes an integrated hub-mast 1, formed essentially of a single piece tubular body, with symmetry of revolution, whose lower part forms a tubular mast 2, whereas its upper part forms a tubular hub body 3. The mast part 2 has a general substantially frustro-conical external shape and diverges from its lower end, formed as a thickened foot 4, towards its upper end, also thickened and by which this mast part 2 is connected to the hub body part 3 and is extended directly by this part 3, which as a general external convex shape formed as an open barrel at its upper free end 5.

The edge of the upper free end 5 of the hubmast 1 defines a circular opening whose diameter corresponds substantially to the internal diameter of the connecting portion of the mast 2 and hub body 3 parts. This single piece tubular body is formed by winding carbon and/or KEVLAR (registered trademark) rovings preimpregnated with an epoxy resin then by curing the resin which is hardened, or by draping folds of carbon and-/or KEVLAR fiber fabrics preimpregnated with epoxy resin, and pressurized hot molding for curing and hardening the resin. A composite structure girdle 6 is disposed inside the hub body part 3. This girdle 6, formed of unidirectional carbon or KEVLAR rovings, has an internal lateral face detined by an annular surface with essentially polygonal cross section, and an external lateral face defined by an annular surface with circular cross section, slightly dished, of a convex shape corresponding to the concavity of the internal face of the hub body part 3 in the form of a barrel, and by which the girdle 6 is fixed to this hub body part 3. Girdle 6 is symmetrical with respect to a median plane M, perpendicular to its axis, and it is fixed to the hub body part 3 so that its median plane M is situated in the plane perpendicular to the axis A of the hub-mast 1 and passing through the section with largest internal diameter of the hub body barrel part 3. The girdle 6 is therefore fixed to the internal face of the hub body part 3, to an annular surface strip defined on this internal face between two transverse planes P1 and P2, perpendicular to axis A and situated at equal distances on each side of the median plane M of the girdle (the plot of these planes M, P1 and P2 being shown with broken lines in FIG. 3). The girdle 6, on which the tubular body of the hub-mast 1 is molded, is in the form of a coiled ring whose internal lateral face (FIGS. 4 and 8) has the form of a pseudo regular polygon, with small equal sides 8 alternating with large equal sides 9 and in number equal to the number of blades of the rotor, the apices of the polygon being substantially rounded, and the external lateral face of the coiled ring forming the girdle 6 is wound circularly at the internal diameter of the hub body. Since the rotor example shown in these Figures are four bladed rotors, recess 7 has substantially a square shape seen from the top, defined by four large sides 9 joined together by four small sides 8 (only one of which is visible in FIG. 4), these latter corresponding, on the internal lateral face of girdle 6, to facets against which stratified spherical stops are fixed as will be explained herebelow. This particular form of the girdle 6 confers thereon excellent rigidity. In the tubular body thus formed with its internal girdle 6, pairs of haricot bean shaped openings, in number equal to the number of blades of the rotor, are machined in the hub body part 3. In the rotor examples shown in the Figures, the four pairs of openings are spaced evenly apart circumferentially about the periphery of the barrel part 3 and each pair of openings is pierced facing one of the small sides 8 of the internal polygonal recess 7 of girdle 6.

The two openings 10 and 11 of each pair are spaced axially apart on each side of the girdle 6, one being a lower opening 10 pierced in the zone of the hub body part 3 which extends between girdle 6 and the mast part 2, and the other opening being an upper opening 11 pierced in the zone of the hub body part 3 which extends between girdle 6 and the upper edge 5 of this barrel part 3. The openings 10 and 11 are in the form of a haricot bean and have their concavity turned towards each other, while being symmetrical one with the other with respect to the median plane M of the girdle 6, as is clearly shown in FIG. 3. The ends in the circumferential direction of the four lower openings 10 are practically situated in the transverse plane P1 limiting downwardly the zone in which girdle 6 bears against the inside of the barrel part 3, whereas the ends in the circumferential direction of the four upper openings 10 are practically in the transverse plane P2 limiting upwardly this same zone by which girdle 6 bears against the barrel part 3.

The two openings 10 and 11 of the same pair define therebetween, on the hub body barrel part 3, a portion extending in the circumferential direction in the form of a bridge 12. Each of the four blades of the rotor is connected to the hub body part 3 by a stratified spherical stop, allowing the blade to pivot on hub 3 about its three flapping, drag and change of pitch axes, which intersect at the swivel point defined by the center of rotation of the corresponding stratified spherical stop. This member is a component henceforth well known, having essentially a stratified central part, formed of a stack of layers in the form of spherical skull caps alternatively rigid, for example made from metal, and resilient, made from a resilient material such as a synthetic rubber, for example silicon elastomer, this stratified central part being vulcanized between two rigid frames, for example made from metal. In the embodiment shown in FIG. 1B and in FIGS. 2 to 4, each spherical stratified stop 13 is applied against a small side 8 of the recess 7 of the composite girdle 6, opposite a bridge 12 between the corresponding openings 10 and 11, and stop 13 is fixed against the girdle 6 by its external radial frame 14, formed, in its external part, as a small stirrup opened outwardly so as to partially straddle the upper and lower faces of girdle 6, which by a surface bearing transfers forces and moments to the girdle 6. By its internal radial part, of a convex shape, the external frame 14 is fixed to the external concave face of the central stratified part 15 of this stop 13, whereas this central stratified part 15 is fixed, by its convex internal face, to the external concave radial part of the internal frame 16. The spherical stop 13 is disposed inside the hub body barrel part 3, so that its center of rotation is situated in the median plane M of the girdle 6 and in the thickness of the corresponding bridge 12, and stop 13 is held in position by means of a bolt 17 introduced from the outside of the hub body 3 into a socket 18 engaged in aligned holes pierced in bridge 12, the girdle 6 and the external frame 14 in which the threaded end of the shank of bolt 17 is threaded.

The root of each blade is formed as a forked fastening 19 with two superimposed branches, the lower branch 20 of which passes through the corresponding lower opening 10 and the upper branch 21 of which passes through the corresponding upper opening 11, the radial internal ends of the two branches 20 and 21 being fixed against the internal frame 16 of the spherical stop 13 by two bolts 22 which each pass through aligned holes pierced in the internal frame 16 and in these internal ends of branches 20 and 21, the heads of bolts 22 bearing against the upper face of the upper branch 21, and the threaded ends of the shanks of bolts 22 being screwed into a rigid heel 23 thus fixed against the lower face of the internal end of the lower branch 20.

The internal frame 16 connecting the forked root 19 of the blade to the spherical stop 13 also serves as spacer holding the two branches 20 and 21 apart with constant spacing.

For limiting the downward flapping movements of the blade, at low or zero rotational speeds of the rotor, heel 23 cooperates with reciprocal ring 24, made from a composite material, having carbon fibers agglomerated in a hardened resin, and girdled with a steel strip. This reciprocal ring 24 is mounted for lateral or radial sliding in an outwardly open U shaped housing formed by the association of a lower annular plate 25 fixed by a ring of screws 26 to an upper annular member 27 having a substantially T shaped section, itself fixed by several screws such as 28 to the lower narrowed end of a frustro-conical support 29, coaxial with the hub-mast 1, engaged in this latter through the opening in its upper edge 5, and the upper part 30 of which is widened out and rounded outwardly, and bent back over the upper edge 5 of the hub body part 3, to which this upper part 30 is fixed, for example by means of screws (not shown). The frustro conical support 29 extends axially inside the hub-mast 1 over a sufficient distance for the U shaped housing 25-27 and the reciprocal ring 24 to be situated slightly below the level of the lower openings 10, so that the heels 23 of the blades come to bear against the reciprocal ring 24 as soon as the blades are no longer sufficiently acted on by the centrifugal force and pivot downwardly about the centers of rotation of the spherical stops 13 through a predetermined angle. The lower stop device inside hub 3 and formed by the reciprocal ring 24, housing 25-27 and support 29 is dimensioned so as to absorb the static moment of the blades when the rotor is stopped.

The drag damping of each blade and the resilient return thereof to its neutral axis are provided by a member external to the hub-mast 1 and disposed laterally between the hub body part 3 and the blade root 19. This member, called drag damper, resilient drag strut with incorporated damping or even frequency adapter, may be a hydraulic member or a visco-elastic member formed of an alternating stack of rigid plates and of plates made from a visco-elastic material or coaxial tubes between which is incorporated a cylindrical sleeve made from a visco-elastic material. It is coupled by its ends, by means of ball and socket joints, on the one hand to the blade root 19 and on the other to the hub body part 3 by means of a coupling fastening 31, projecting radially outwardly of the zone defined on this hub body part 3 between the two transverse planes P1 and P2, by a curved base 32 extending circumferentially between two adjacent pairs of openings in the shape of a haricot bean and bolted in position. In FIG. 4, the drag dampers have not been shown and only the longitudinal axes 33 of two of them are shown, the fastenings 31 giving to these dampers a substantially tangential orientation with respect to the hub body part 3.

The root 19 of each blade also has, on the side opposite the drag damper, a lever 34 for controlling the angle of attack of the blade, which is fixed to root 19 by two bolts 35.

For coupling a rotational drive compas of the rotary cyclic plate (not shown) to the hub-mast 1, a fastening 36 is fixed projecting outwardly from the connecting zone of the mast 2 and hub body 3 parts.

Finally, a fitting 37 is bolted about the foot 4 of the hub-mast 1 for connecting this latter to a rotational drive device for fixing to the main gear box, this device having at least one bearing.

On the rotor head thus formed, the composite girdle 16 inside the hub-mast 1, and which is fixed thereto, working under traction takes up the centrifugal forces exerted on the blades for balancing them with each other, these centifugal forces practically not acting on the hub-mast 1 itself The alternate bending forces at the level of the spherical stops 13 induce in the hub-mast 1 relatively small flexion and shearing stresses and in particular the vertical flapping forces transferred to the spherical stops 13 pass from these latter to girdle 6 and from this latter to the hub-mast 1 directly as far as the fitting 37 on its foot 4, with moderate traction/compression forces.

The rotor is simple to mount after fitting the hub-mast 1 on the main gear box, the spherical stops 13 are successively introduced into the hub body part 3 through the opening of sufficient diameter in the upper edge 5 thereof, and are fixed in position against the girdle 6. Then the blades with forked root 19 are fitted one by one and, for each one, the lower 20 and upper 21 branches are engaged in the corresponding openings 10 and 11. Then the internal ends of branches 20 and 21 are bolted to the internal frame 16 of the corresponding spherical stop 13, by means of the two bolts 22 which screw into the corresponding heel 23 Then the frustroconical support 29 is fitted from the top, on the lower end of which the U shaped housing 25-27 and the reciprocal ring 24 have been previously mounted, and this support 29 is fitted axially into the hub-mast 1 until its curved part 30 comes into abutment against the upper edge 5 of the hub-mast 1, to which the curve part 30 is fixed by a ring of screws. Then the drag dampers are coupled to the hub-mast 1 and the levers controlling the angle of attack of the blades to the corresponding control links.

The dismantling operations take place in the reverse order. With this rotor head arrangement the spherical stops 13 as well as the lower stop device with reciprocal ring 24 and heels 23 can be placed close to the axis A of the rotor, without hindering the movements of blades with respect to the hub-mast 1 about the rotational centers of the spherical stops 13, because of the passage and deflections of the lower and upper branches 20 and 21 respectively in the haricot bean shaped openings 10 and 11 formed in the hub-mast 1. This arrangement leads then to a reduced space requirement and to a lower weight as well as to a smaller aerodynamic drag and to a low level of vibratory excitation, because the flapping excentricity is low. The second embodiment shown in FIG. 1A and in FIG. 5, is only distinguished from the one which has just been described by two main differences: one concerns the member connecting each blade to the internal frame of the corresponding spherical stop, and the other the connection of the external frame of this spherical stop to the hub-mast 1. In fact, this rotor head is intended for a rotor with blades which are foldable by pivoting substantially in the plane of the rotor. Thus, the foot 38 of each blade (shown with broken lines in FIG. 5) is connected to the corresponding spherical stop 13' by a radial sleeve 39, whose internal endmost part is in the form of a clevis with two branches 40 and 41, the lower branch 40 passing through the lower opening 10 of a pair of haricot bean shaped openings in the hub body part 3, and the upper branch 41 passing through the upper opening 11 of this pair of openings, for fixing by their internal ends to the internal frame 16 by the two bolts 22. The external endmost part of sleeve 39 is also in the form of a clevis, and the blade root 38 is engaged between the lower branch 42 and the upper branch 43 of this external clevis, while being retained therebetween by two shafts disposed side by side perpendicular to the plane of the rotor, and which pass through these two branches 42 and 43 and the blade root 38, one of the shafts being removable so as to allow the blade to pivot about the other shaft. In this case, it is sleeve 39, which, on one side has a fastening for coupling to the external end of the drag damper and, on the other side, has the lever for controlling the pitch of the corresponding blade.

The other main difference is that the external frame 14' of the spherical stop 13' is, in its external part, in the form of a stirrup 44 which covers the composite girdle 6 and the bridge 12 of the hub body part 3, between the two openings 10 and 11. A cover 45 is applied from the outside against bridge 12 and against the external ends of the stirrup 44 to which the cover 45 is fixed by two lines of screws 46. This method of mounting has the advantage, with respect to the use of a bolt 17 passing through the bridge 12 and girdle 6 for screwing into the internal frame 14, as shown in FIG. 2, the advantage of allowing all the forces and moments to pass from the spherical stop 13' to the hub-mast 1 by direct surface bearing, without weakening the structure of the hub-mast 1 and that of girdle 6 by holes pierced in working parts.

The third example, shown in FIGS. 6 to 8, is similar to the second example which has just been described to the extent that, on the one hand, the root 13 of each blade is connected to the internal frame 16 of the corresponding spherical stop 13' by a sleeve 39' whose two endmost parts are in the form of clevises, so that the blade may pivot about one of the two shafts fixing the blade root 38 to the two branches 42' and 43' of the external clevis, after removal of the other shaft which is removable, and so that the internal frame 16 is mounted as a spacer between the internal ends of the two branches 40' and 41' of the internal clevis. On the other hand, the external frame 14' of the spherical stop 13' has its external part in the form of a stirrup 44 straddling the girdle 6 and bridge 12' and fixed by screws 46 to the cover 45.

But, in this example, bridge 12' defined between openings 10' and 11' has rectilinear upper and lower edges (see FIG. 7), which facilitates the formation of openings 10' and 11', of the stirrup 44 and of cover 45 as well as positioning thereof. In addition, the hub-mast 1', although in the shape of a truncated cone in its mast part 2' and convex in its hub body part 3', does not have a barrel shape in this part 3'. The hub-mast 1', also made from a composite material, is formed by draping and with constant thickness, then it is machined at its ends so as to have a foot 4' and an upper end 5' which are tapered, foot 4' being nipped between bolted fittings 37' and 47 for connection to the rotational drive device of the hub-mast 1'.

In this example, the reciprocal ring 24 is mounted for sliding in an outwardly U shaped housing formed by bolting an upper annular member 48, having a cross section in the form of an L lying flat, to a lower annular member 49 of a T shaped cross section, itself fitted and retained by screws (not shown) in the upper cylindrical part 51 of a composite or metal support 50. This latter has a truncated cone shaped downwardly diverging shell 52 which is extended by a truncated cone shaped downwardly converging centering surface 53 by which support 50 bears against the internal face of the first part 2'. The reciprocal ring 24 cooperates with a heel 23' fixed under the lower face of the internal end of the lower branch 40' of sleeve 39' by the two bolts 22 fixing the two branches 40' and 41' to the internal frame 16 of the spherical stop 13'.

In FIG. 6, a damper fastener 31 has been shown whose curved base 32, which extends between two adjacent pairs of openings 10' and 11', is bolted against the external face of the hub body part 3' by two lines of bolts 54, which simultaneously fix to the internal face of this part 3' a U shaped plate 55 with outwardly bent edges intended to distribute the bearing forces of bolts 54. Base 32 has two fastening lugs 56 which are parallel to each other and between which the ball joint 57 of the internal end of the drag damper 58 (shown in FIG. 8) is fixed and which is coupled by another ball joint, at its external end, to the sleeve 39'. This latter has, finally, on the side opposite damper 58, the lever 34' for controlling the pitch of the corresponding blade.

In this example, it is clear that the reciprocal ring 24 and its support 50 are housed in the hub-mast 1' before the introduction and fixing therein of the spherical stops 13'. For the rest, the mounting takes place in the same way as for the preceding examples.

In all these examples, the integrated hub-mast supports a reinforcing girdle which is internal to the hub body part. But it is quite possible to mount the reinforcing girdle about this hub body part. In this case, the coupling fastenings of the resilient return and drag damping members of the blades may be supported by the girdle, whereas the external radial frame of each stratified spherical stop is directly applied against the internal face of the hub body part.

We claim:

1. An integrated hub-mast for a gyroplane rotor having a plurality of blades, the hub-mast comprising:
   a hollow, tubular hub-mast member having an axis of rotation and including a hub body portion, a mast forming portion extending coaxially from said body portion, and a foot portion coaxially formed on an end of said mast forming portion opposite said body portion, said body portion and said mast forming portion being a signal tubular piece with symmetry of revolution,
   said body portion being pierced with pairs of openings equal in number to the plurality of blades to the rotor, the two openings of each pair being spaced axially from each other and being symmetrical ones with the other on opposite sides of a median plane (M) perpendicular to said axis of rotation, said pairs of openings being evenly spaced apart in the circumferential direction about the periphery of said body portion,
   a reinforcing girdle made from a composite material formed of high mechanical strength unidirectional fibers wound and agglomerated by a synthetic and hardened resin fixed to said body portion in said median place (M) between the two openings of each pair perpendicular to said axis of rotation,
   retaining and pivoting members, one for each blade, housed inside said body portion, each retaining and pivoting member having a radially external frame fixed to said body portion and a radially internal frame, a forked fastening part of each blade having two branches, the branches passing through one of said pairs of openings and being fixed to said internal frame of one of said retaining and pivoting members,
   a circular U shaped housing opening radially outwardly coaxially positioned and mounted inside of said hub mast member at an axial level situated between said mast forming portion and the ones of said pairs of openings closest to said mast forming portion,
   a circular support for said U shaped housing fixed to said hub-mast member, and
   a rigid reciprocal ring mounted for lateral sliding in said circular U shaped housing forming a lower stop limiting downward flapping movements of the blades when the rotor is moving slowly or is stopped.

2. The integrated hub-mast according to claim 1, wherein ends of said opening in the circumferential direction of the openings, closest to and furthest away from the mast forming portion are substantially and respectively in a first and in a second transverse plane perpendicular to the axis of rotation.

3. The integrated hub-mast according to claim 1, wherein the two openings of each pair have substantially the shape of a haricot bean and have a concavity turned towards one another.

4. The integrated hub-mast according to claim 1, wherein the reinforcing girdle has an external lateral surface substantially in the shape of a circular ring and an internal lateral surface substantially in the shape of a ring with polygon section.

5. The integrated hub-mast according to claim 1, wherein at least the mast forming portion has a general substantially frustro-conical external shape diverging from said foot portion towards the hub body portion.

6. The integrated hub-mast according to claim 5, wherein the mast forming portion and hub body portion are made from metal, the hub body portion having a general substantially cylindrical or frustro conical external shape diverging towards its end opposite the mast forming portion.

7. The integrated hub-mast according to claim 5, wherein the mast forming portion and hub body portion are made from a composite material including high mechanical strength fibers agglomerated by a hardened synthetic resin, the girdle being formed as a single piece with the hub body portion which has a general substantially convex external shape.

8. The integrated hub-mast according to claim 7, wherein the hub body portion has substantially the shape of a barrel with maximum diameter at the level of the girdle.

9. The integrated hub-mast according to claim 1, wherein the support for the U shaped circular housing includes a frustro-conical portion inside the hub body portion having a small base and a large base and which carries the circular housing at the level of its small base, whereas its large base is extended by a widened out portion folded back, outside the hub body portion, over the free edge (95) of said body portion to which the support is fixed.

10. The integrated hub-mast according to claim 1, wherein the supoprt for the U shaped circular housing is a support with a tubular substantially truncated cone shape surface bearing against the internal face of the mast forming portion and a tubular centering shell also substantially in the shape of a truncated cone which is integral with the bearing surface and which supports the circular housing.

11. The integrated hub-mast according to claim 1, wherein fastenings in number equal to the number of pairs of openings and each intended for coupling to the hub-mast an internal end of a resilient return and drag damping member of a rotor blade, are each fixed by a base against the external face of the hub body portion at an axial level situated substantially between the two openings of the pairs of openings, and the base extends circumferentially about the periphery of the hub body portion between two adjacent pairs of openings.

12. The integrated hub-mast according to claim 1, wherein the foot portion is bolted to a fitting for connection to a rotational drive device fixing the hub-mast to the transmissiosn box.

13. The intergrated hub-mast according to claim 1, wherein, for each blade, the retaining and pivoting members are formed by a stratitifed spherical stop fixed to the inside of the hub body portion so that its center of rotation is practically in the thickness of the girdle, between the two corresponding openings of each pair.

14. The integrated hub mast according to claim 13, wherein the external frame of the stratitifed spherical stop for each blade is outwardly in the form of a stirrup which covers the reinforcing girdle and the portion of the hub body portion which is defined between the two corresponding openings, and a cover, applied against the external face of said portion of the hub body portion and screwed to the stirrup, holds the corresponding spherical stop in position inside the hub body portion.

15. The integrated hub-mast according to the claim 1, wherein a rigid heel, intended to bear against the reciprocal ring so as to limit the downward flapping movement of a blade, is fixed to one of the branches of the forked fastening part of the corresponding blade by two bolts which fix the internal ends of the two branches of this forked fastening part to the internal frame of the corresponding retaining and pivoting members.

16. The integrated hub-mast according to the claim 11, wherein, for each blade of the rotor, the resilient return and drag damping member is mounted outside the hub body portion, between one of the coupling fastenings fixed against the external frace of this body portion and a coupling fastening carried by the forked fastening part of the corresponding blade.

17. The integrated hub-mast according to claim 16, wherein it also includes, for each blade of the rotor, a lever for controlling the angle of attack of the blade, which is fixed to the corresponding forked fastening part, on the side opposite the return member and inside the hub body portion.

18. The integrated hub-mast according to claim 1, wherein the forked fastening part of each blade is integrated with the blade foot.

19. Integrated hub-mast according to claim 1, wherein the forked fastening part of each blade is a substantially radial fastening sleeve formed at its internal end as a clevis whose two branches are fixed to the internal frame of the corresponding retaining and pivoting members and is formed at its external end as a clevis for fixing to the root of the corresponding blade by two shafts substantially parallel to the axis of rotation of the rotor and one of which is movable so as to allow the blade to be folded back by pivoting about the other shaft.

* * * * *